United States Patent
Otto-Lübker et al.

(10) Patent No.: US 11,197,465 B2
(45) Date of Patent: Dec. 14, 2021

(54) POULTRY MANAGEMENT DEVICE HAVING A DRYING DEVICE

(71) Applicant: BIG DUTCHMAN INTERNATIONAL GMBH, Vechta (DE)

(72) Inventors: Friedrich Otto-Lübker, Vechta (DE); Jörg Küking, Vechta (DE); Günter Möller, Vechta (DE); Krste Pucoski, Vechta (DE); Sebastian Gerken, Vechta (DE)

(73) Assignee: BIG DUTCHMAN INTERNATIONAL GMBH, Vechta (DE)

( * ) Notice: Subject to any disclaimer, the term of this patent is extended or adjusted under 35 U.S.C. 154(b) by 273 days.

(21) Appl. No.: 16/397,523

(22) Filed: Apr. 29, 2019

(65) Prior Publication Data
US 2019/0327940 A1 Oct. 31, 2019

(30) Foreign Application Priority Data
Apr. 30, 2018 (DE) .......................... 202018102416.7

(51) Int. Cl.
  *A01K 31/04* (2006.01)
  *A01K 31/22* (2006.01)
  *F26B 17/04* (2006.01)
(52) U.S. Cl.
  CPC .............. *A01K 31/04* (2013.01); *A01K 31/22* (2013.01); *F26B 17/04* (2013.01)

(58) Field of Classification Search
  CPC ................................ A01K 31/04; A01K 31/22
  See application file for complete search history.

(56) References Cited

U.S. PATENT DOCUMENTS

| | | | |
|---|---|---|---|
| 3,268,067 A | 8/1966 | Prentice et al. | |
| 4,909,825 A | 3/1990 | Eigner | |
| 5,007,379 A * | 4/1991 | Lackner | A01K 31/005 119/455 |
| 5,036,797 A * | 8/1991 | Koozer | A01K 1/0058 119/448 |
| 5,410,985 A * | 5/1995 | Schritz | A01K 41/00 119/314 |
| 5,901,665 A | 5/1999 | Lackner | |
| 5,950,565 A * | 9/1999 | Guyot | A01K 1/0047 119/454 |
| 9,291,392 B2 | 3/2016 | Themann | |
| 9,820,472 B2 | 11/2017 | Bussema et al. | |

(Continued)

FOREIGN PATENT DOCUMENTS

| | | |
|---|---|---|
| CA | 2184151 | 2/1997 |
| CN | 101674724 | 3/2010 |

(Continued)

*Primary Examiner* — Jessica B Wong
(74) *Attorney, Agent, or Firm* — Price Heneveld LLP

(57) ABSTRACT

A poultry management device comprises a living area for the poultry, a collection device having a collection face for poultry droppings, the collection device being disposed below the living area, and a drying device configured for drying the poultry droppings on the collection device. The drying device comprises a fan element which is mounted so as to be pivotable about a pivot axis which is aligned at an angle of 45° to 90° in relation to the collection face.

12 Claims, 5 Drawing Sheets

(56) References Cited

U.S. PATENT DOCUMENTS

| | | | |
|---|---|---|---|
| 2005/0150747 A1 | 7/2005 | Menendez | |
| 2008/0178819 A1 * | 7/2008 | Sia | A01K 31/00 |
| | | | 119/300 |
| 2010/0294624 A1 | 11/2010 | Warner | |
| 2011/0203787 A1 * | 8/2011 | Meter | F24F 11/30 |
| | | | 165/287 |
| 2013/0092512 A1 | 4/2013 | Buschmann et al. | |

FOREIGN PATENT DOCUMENTS

| | | | | |
|---|---|---|---|---|
| CN | 107743893 | | 3/2018 | |
| DE | 19634126 | | 2/1997 | |
| EP | 0387819 | | 9/1990 | |
| EP | 0740900 | | 11/1996 | |
| EP | 2003412 | | 12/2008 | |
| ES | 2036482 | | 5/1993 | |
| ES | 2065788 | | 2/1995 | |
| FR | 2693628 | | 1/1994 | |
| FR | 2746587 | A1 * | 10/1997 | A01K 31/04 |
| JP | H0387127 | | 4/1991 | |
| JP | H08121960 | | 5/1996 | |
| JP | H9163890 | | 6/1997 | |
| JP | H09163890 | | 9/1997 | |
| JP | 2006115773 | | 5/2006 | |

* cited by examiner

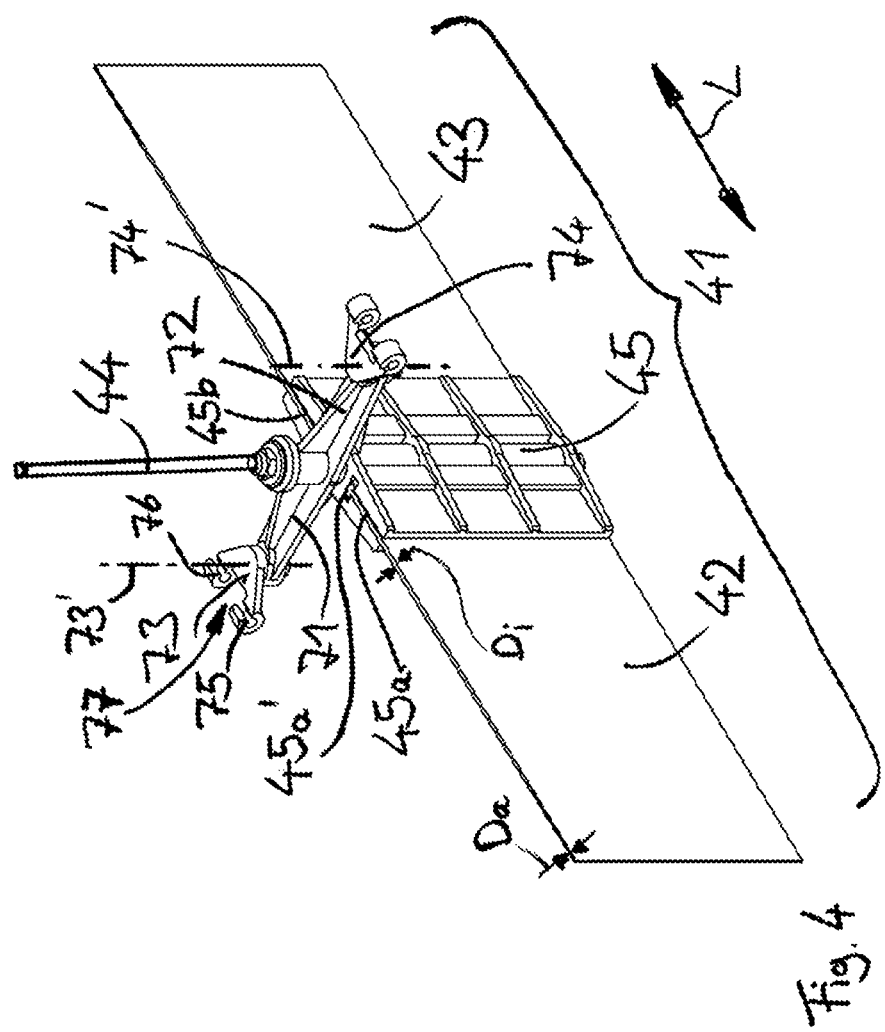

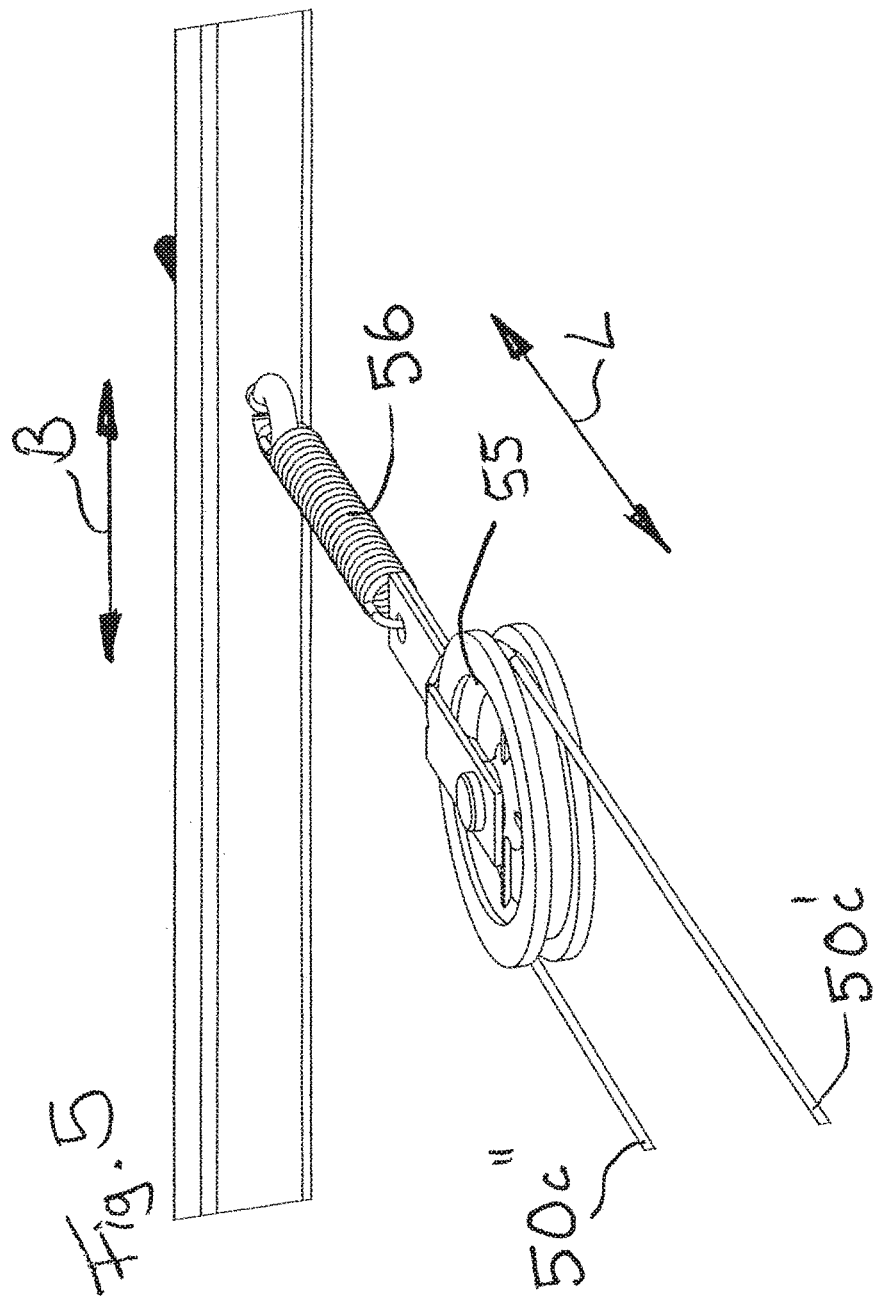

POULTRY MANAGEMENT DEVICE HAVING A DRYING DEVICE

CROSS-REFERENCE TO FOREIGN PRIORITY APPLICATION

The present application claims the benefit under 35 U.S.C. §§ 119(b), 119(e), 120, and/or 365(c) of German Application No. 202018102416.7 filed Apr. 30, 2018.

FIELD OF THE INVENTION

The invention relates to a poultry management device comprising a living area for the poultry, a collection device having a collection face for poultry droppings, said collection device being disposed below the living area, and a drying device which is configured for drying the poultry droppings on the collection device. A further aspect of the invention is a drying device for drying poultry droppings lying on a collection face of a collection device in a poultry management device.

BACKGROUND OF THE INVENTION

Poultry management devices are used for keeping poultry for the production of meat or eggs. Said poultry management devices can be, for example, forms of keeping in aviaries or cages; forms of keeping in which the animals have a floor living area and a retreat area for laying eggs or for resting phases on an elevated animal living area can likewise be used.

Droppings which are produced by the animals and which for reasons of hygiene have to be removed in a timely fashion from the animal living area arise regularly in poultry management devices of this kind. To this end it is known, for example, for a collection region for the animal droppings to be disposed below an animal living plane which is disposed so as to be elevated and which is embodied as, for example, a permeable perforated or mesh-type standing area. An endless conveyor belt as a collection face can be disposed in said collection region, for example, the animal droppings being collected and transported away by said endless conveyor belt. For reasons of reducing environmental stress it is an objective of the invention to supply the animal droppings to further efficient use. For example, the animal droppings may be further processed, for example, may be granulated, to be supplied to gasification or combustion so as to achieve a conversion of energy therefrom which can serve to generate power.

It is typically desirable for the animal droppings to be dried for said further processing. To this end, it is known for the animal droppings to be exposed to a drying air stream, for example, in a vertical multi-stage drying belt device, said drying air stream being generated by an air conveying device in the shape of a ventilator. The animal droppings in this instance are dried by said drying air stream on a preferably perforated drying belt. Such a drying device is already known from EP 2 003 412 B1.

In order for the drying to be accelerated, it is known for the animal droppings to already be impinged with a drying air stream on the conveyor belt that serves as the collection face. To this end, a drying device which has an air duct which is impinged with an air stream and which from lateral exit openings directs an air stream onto the animal droppings on the conveyor belt below the animal living area is known from U.S. Pat. No. 9,820,472 B1. Drying devices of this type, directly below the respective animal living area, have the disadvantage that the transportation of compressed air required therefor has to be performed over comparatively long distances through the air duct with the aid of, for example, radial blowers, and significant pressure losses are created herein on account of the friction of the air on the walls, the result being poor energy efficiency in relation to the drying performance achieved. The friction-related pressure loss in relation to the air duct length, or the system length, respectively, furthermore results in the drying quality at more remote collection faces being lower than in the case of shorter distances.

The known drying devices do indeed achieve drying of the animal droppings, but the installation of a separate drying tunnel is required to this end, and the drying requires a certain period of time. It is desirable for the drying to be improved in terms of both the drying uniformity achieved in relation to the system length and the energy invested. The invention has the object of providing a drying device that is improved in those terms.

The object on which the invention is based is achieved by a poultry management device of the type described at the outset, in which poultry management device the drying device comprises a fan element which is mounted so as to be pivotable about a pivot axis which is aligned at an angle of 45° to 90° in relation to the collection face.

A poultry management device which has a living area for poultry is provided according to the invention. Said living area can be an enclosed or an open area in which the animals can move and live on one or a plurality of living planes. Animal droppings defecated by the animals are collected by a collection device that is disposed below the living area. The living area is accordingly designed such that the animal droppings do not remain in the living area per se but can drop through a correspondingly permeable delimitation of the animal living area, for example, a mesh-type or perforated standing area for the animals, or else can (also) drop laterally out of the animal living area. The animal droppings are then collected by a collection face and accumulate on said collection face. The collection face can be disposed so as to be horizontal or inclined and be formed, for example, by a conveying device, the transporting face thereof partially or completely representing the collection face. To this end, a conveyor belt which can be closed or perforated can be used. Furthermore, the collection face can receive devices, for example, cable-pulled slider elements or clearing elements, which carry out the outward transportation of the droppings. The animal droppings in such devices are either transported away in the longitudinal direction or are cleared away laterally at 90° in relation to the longitudinal extent.

This type of poultry management device having a living area and a collection device is known as a type of construction of an aviary or a cage arrangement, for example, in which a plurality of planes in which the animals can live are tiered in the vertical direction and the animal living area extends as a row of cages or aviaries in the longitudinal direction. In the case of such poultry management devices, a plurality of vertically spaced apart collection devices which are in each case disposed below a portion of the living area are often provided.

According to the invention, a drying device of a specific configuration is a component part of the poultry management device. Said drying device serves for drying the animal droppings which are disposed on the collection face. For this purpose, the drying device comprises a fan element. A fan element herein is generally to be understood to be a plate-like, belt-like, or tape-like planar element which has a certain rigidity but can also have a certain elasticity. Said fan element serves for moving air and for this purpose is mounted so as to be pivotable about a pivot axis in such a manner that said fan element can carry out a relative movement in relation to the animal droppings on the collection face. Said relative movement generates an air movement which achieves a continuous exchange of air with the ambient air and thus an absorption of water by the air and a drying effect on the animal droppings on the collection face.

It is provided according to the invention that the pivot axis of the pivoting movement of this fan element is aligned at an angle of 45° to 90° in relation to the collection face. The pivot axis preferably runs at an angle of 90° to the collection face, thus is exactly perpendicular to the plane in which the collection face runs. When the collection face comprises curved or angled portions, an averaged profile of the collection face can serve herein as the plane in which the collection face runs and as a reference for the angular position of the pivot axis in relation to the collection face; a horizontal position of the collection face is in general provided in many poultry management devices, having a peripheral feature that is angled upward potentially implemented herein. In this case, the pivot axis therefore preferably lies exactly vertically or at an angle that is inclined up to 45° in relation to the vertical.

It is to be understood that the pivot axis is preferably at a temporally consistent angle in relation to the collection face, thus that said pivot axis does not vary in its angular position in relation to the collection face during the drying procedure; however, temporally varying angular positions within the angular range stated are likewise comprised by the invention.

The advantage that the droppings are dried already in the poultry management device and not only in a downstream step at a remote location is achieved by the design embodiment according to the invention. Since wet or moist droppings, to a significant extent, cause more intense ammonia emissions than dry droppings, the consequences of an intense ammonia emission in the form of a compromised shed climate causing irritations to the mucosae of the animals and a deterioration in the general wellbeing of the animals can be thereby avoided, and the necessity of a complex exhaust air treatment of the shed air in order to remove the ammonia from the shed air can contemporaneously be dispensed with.

It has proved furthermore advantageous according to the invention that the temporal period required for the drying, as well as the installation space required therefor and the complexity in terms of equipment, can be significantly reduced in comparison with previously known solutions. Fewer friction losses arise, and an installation space which to a certain extent existed already as free space in known poultry management devices can be utilized.

In certain applications it can be advantageous for an inclined alignment of the pivot axis instead of the exactly perpendicular alignment of the pivot axis in relation to the collection face to be provided, for example, in an angular range which is smaller than 90°, such as an angular range which is between 80° and 90° in relation to the collection face. The angular range can generally be selected such that said angular range is selected so as to have a lower limit of 45°, 60°, 75°, or 80°. A perpendicular alignment, thus an angular position of 90° in relation to the collection face, has proven advantageous as an upper range limit of the angle included in said angular range.

A pivotable mounting of the fan element according to the invention is to be understood to be a mounting which enables in general a rotating movement, thus a pivoting movement or a rotary movement, about the pivot axis. This can be implemented by a shaft that rotates in a mounting, or by a stationary physical axle about which a mounting of the fan element rotates.

It is preferable for a reciprocating pivoting movement, thus a repetitive back-and-forth pivoting movement, to be carried out by the fan element in a predetermined, delimited angular range, for example an angular range which is smaller than 180°, smaller than 120°, smaller than 90°, smaller than 75°, smaller than 60°, or smaller than 45°, and for said pivoting movement to be enabled by the pivotable mounting about the pivot axis and a potential drive. However, in certain specific applications the fan element can also carry out a rotating or pivoting movement across the entire angular circumference of 360°.

According to a first preferred embodiment it is provided that the fan element has a fan face which runs so as to be parallel to the pivot axis or perpendicular to the collection face, in particular, that the fan element is formed by a fan face which runs so as to be parallel to the pivot axis or perpendicular to the collection face. It is to be understood in principle that the fan element can be disposed in various alignments in order for the desired movement of air to be achieved. However, an alignment in which the fan element is disposed in such a manner that a fan face configured thereon runs so as to be parallel to the pivot axis or perpendicular to the collection face is particularly preferred. This alignment can, in particular, have the effect that the fan element by way of the pivoting movement moves in such a manner that the direction of movement is perpendicular to the fan face, the air by way of the fan element thus being displaced in a frontal manner in the circumferential direction of rotation.

It is, in principle, preferable for the entire fan element to be aligned in such way so as to be perpendicular in relation to the collection face, and to also remain so in the pivoting movement. This means that the fan element can potentially perform an elastic deformation about a bending axis that lies so as to be parallel to the pivot axis but is preferably not deformed about axes that are inclined in relation to the pivot axis. However, embodiments which have a fan element which has part-portions having an alignment that is not parallel to the pivot axis or an alignment that is not perpendicular to the collection face, or are even entirely not aligned in this way but run so as to be obliquely inclined in relation to the pivot axis or the collection face can be used in other applications. This alignment of the fan element or planar portions thereof can also arise by way of an elastic deformation in the course of the accelerations in the pivoting or rotating movement, in that the fan element or parts thereof are deformed about a horizontal axis or are pivoted when the pivoting movement is carried out.

According to a further preferred embodiment it is provided that the drying device is disposed between the living area and the collection face. Such a disposal of the drying device, thus specifically in particular of the fan element, or of the plurality of fan elements, if present, between the living area and the collection face is generally preferred because a drying effect by movement of air onto the animal droppings from above can effectively take place on account thereof. Furthermore, existing installation space between the collection face and the animal living area can be utilized for the drying device. Parts of the drying device, for example, parts associated with the drive of the fan elements, can also be disposed at another location and not be situated between the living area and the collection face; in the context of the invention this is nevertheless a disposal of the drying device between the living area and the collection face. The drying device in other embodiments could also be disposed below the collection face and in this instance interact with a perforated or air-permeable, respectively, collection face, in order for the drying to be effected.

It is even furthermore preferable for the drying device to comprise a drive installation which is configured for setting the fan element in a rotating movement about the pivot axis, wherein the rotating movement is a continuous rotating movement about the pivot axis or a reciprocating pivoting movement about the pivot axis. According to this refinement a drive installation is a component part of the drying device. Said drive installation is configured for generating an automated rotating movement of the fan element about the pivot axis. For this purpose, the drive installation can comprise, for example, an electric drive motor which by way of a respective mechanical transmission installation transmits a driving action to the fan element or to a plurality of fan elements. The drive installation herein can be configured for a continuous rotating movement about the pivot axis; in the case of this embodiment a rotating movement consequently takes place in a consistent rotating direction across the full circular circumference. Alternatively, it is preferable for the drive installation to be configured for a reciprocating pivoting movement about the pivot axis. In the case of this embodiment, the rotating movement takes place as a back-and-forth movement of the fan element, in which the fan element consequently repeatedly changes the rotating direction thereof. The reciprocating pivoting movement herein can be performed across a comparatively small or large angular range, or else be a complete circular movement across 360°.

The drive installation can be configured for driving a plurality of fan elements that are mechanically coupled to said drive installation in a synchronous pivoting movement, thus a pivoting movement in which the driven fan elements contemporaneously pass the reversal points of the reciprocating movement. Alternatively, the fan elements by the drive installation can also be driven in an out-of-phase manner so that said fan elements do not all contemporaneously pass the reversal points.

It is even furthermore preferable for the fan element to comprise a first plate-shaped element which, proceeding from the pivot axis, extends in a first radial longitudinal direction. It can furthermore preferably be provided that the fan element comprises a second plate-shaped element which, proceeding from the pivot axis, extends in a second radial longitudinal direction which, proceeding from the pivot axis, preferably runs in a direction opposing the first longitudinal direction. The fan element, according to these two embodiments, comprises either one or two plate-shaped elements which, proceeding from the pivot axis, extend in different radial directions. In the case of a single plate-shaped element, the fan element, proceeding from the pivot axis, extends in a single direction; in the case of two plate-shaped elements it is preferable for said plate-shaped elements, proceeding from the pivot axis, to extend in two opposing directions, the fan element consequently being constructed in the manner of a dual-blade propeller having the blade position in the feathering pitch. It is in principle preferable for the plate-shaped elements to extend in the radial direction by a length greater than a width in the axial direction of said plate-shaped elements. This has proven particularly efficient in terms of a positive drying effect. The plate-shaped elements can have a substantially rectangular contour, but can also have a contour having radiused corners, and/or a trapezoidal or triangular contour, so as to ideally design the fan effect as a function of the circumferential speed.

It is yet furthermore preferable for the first and optionally the second plate-shaped element to comprise an elastomeric material, in particular, to be configured from an elastomeric material. On account of the partial or complete design embodiment of the plate-shaped element from an elastomeric material, a favorable elastic deformation of the plate-shaped element in the pivoting movement is enabled. In particular, when a reciprocating movement of the fan element having a repeated reversal of the rotating direction about the pivot axis is performed, the required maximum torque for braking and accelerating at the reversal point of the reciprocating movement can be reduced and as a result destressing of the mechanical components of a drive installation and all of the components for fastening the drying device to the poultry management device can be achieved on account of such an elastomeric property. An elastomeric material herein is to be understood to be a material having an elastic behavior from the group of plastics which are configured so as to be similar to rubber or according to the properties of, for example, a thermoplastic polyurethane.

It is yet further preferable for the first and optionally the second plate-shaped element to have an elastic deformation capability which is configured such that the first and optionally the second plate-shaped element is/are elastically deformed when driven by the drive device. According to this embodiment, the elasticity of the first or of the second plate-shaped element, respectively, thus the elasticity modulus and the material dimensioning, is chosen in such a manner that an elastic modification of the shape takes place in the movement which is exerted by the drive device on the plate-shaped elements. This elastic deformation can arise by the drag at the speeds of movement generated, on the one hand, and by moments of inertia arising in the deceleration and acceleration at the reversal points of a reciprocating pivoting movement about the pivot axis, on the other hand. As previously explained, such an elastic deformation is preferable since the system, on account thereof, behaves in a less rigid manner and force peaks or torque peaks can therefore be avoided or minimized.

It is yet furthermore preferable for the drive device to be configured in such a manner that it drives the fan element or optionally the fan elements in a pivoting movement that is configured so as to be reciprocating, and for the frequency of the pivoting movement to be in a range about a resonant frequency of the drying device, preferably in a resonant frequency of the drying device. According to this embodiment, a reciprocating pivoting movement of the fan elements takes place, thus a form of movement which comprises repeated decelerations and accelerations. In the case of such a form of movement a certain elastic deformation takes place in all real systems, in particular also in the drying device according to the invention which preferably has one or two elastically deforming plate elements which form the fan element. In the case of such elastic deformations arising, the system is characterized by one or a plurality of resonant frequencies. The amplitude of the resonant frequency (frequencies) herein is a function of the rigidity properties and the mechanical coupling connections of the system.

When such a system in terms of the reciprocating movement is driven at a frequency which corresponds to the resonant frequency or is close to the resonant frequency, for example, in a range of +/−5% or +/−10% about the resonant frequency, a low drive output is typically required in order for the movement to be carried out. This can be explained in that little or no drive energy has to be used when operating in the resonant frequency in order for components of the drying device to be elastically deformed, the elastic deformations that do arise on account of the braking and accelerating actions rather facilitating the movement or at least not impeding the latter.

The operation in the resonant frequency, or close to the latter, in the case of the drying device according to the invention can be distinguished, for example, in that the elastically deformable plate-shaped elements during a movement in a first direction of the reciprocating movement are deformed in a first direction, are deformed from said first direction to a second direction at the reversal point of the reciprocating movement and, just prior to or when reaching the maximum deformation in the second direction, are accelerated in the other, second, direction of the movement of the reciprocating form of movement such that no further reverse deformation in the first deformation direction, or oscillating between the first and the second deformation direction at the reversal point of the reciprocating movement, takes place.

Elastic systems which are exposed to a reciprocating form of movement often have more than one resonant frequency. Oscillating back and forth twice between the first deformation direction and the second deformation direction of the plate-shaped element, or oscillating back and forth three times, at the reversal point can thus take place at another resonant frequency. However, in terms of energy savings in the operation of the drying device in or close to a resonant frequency, it is preferable for no or no substantial oscillating behavior of the plate-shaped elements to take place during the movement outside the reversal points.

According to a further preferred embodiment it is provided that the drive device comprises a drive unit which by means of a coupling element is mechanically connected to the fan element, wherein the coupling element is preferably a cable pull device. The drive device according to this embodiment can, in particular, comprise a central drive unit, such as an electric motor, which can drive one or a plurality of fan elements. It can be provided, for example, that one drive unit is provided for a plurality of planes of an entire row, or for one plane of one row, of poultry living areas, and drives in each case a plurality of fan elements in the plane(s) in a pivoting movement about a corresponding plurality of pivot axes. The coupling element provided to this end can comprise a plurality of individual coupling components which are in particular longitudinally extending coupling components such as, for example, rods or cable pulls. The drive device herein can be coupled in such a manner that said drive device in one direction of movement of a reciprocating movement transmits a tensile force which acts so as to oppose a spring element, for example, so as to oppose spring elements that act separately about each pivot axis and that cause a restoring force that opposes the driving force. Resetting in the other direction of movement can then be performed by the spring force/spring forces. In another embodiment, the coupling element can be embodied such that said coupling element transmits a driving force in both directions of movement of a reciprocating movement.

It is yet further preferable for the living area to extend in a row along a longitudinal direction, and for the drying device to comprise a plurality of fan elements which are in each case mounted so as to be pivotable about a pivot axis that is assigned to each fan element, wherein the pivot axes are aligned at an angle of 45° to 90° in relation to the collection face and are mutually spaced apart in the longitudinal direction. According to this embodiment, the drying device comprises a plurality of fan elements and, on account thereof, can subject a comparatively large region of the collection face to a drying effect. The fan elements herein are spaced apart in the longitudinal direction. The spacing between the plurality of pivot axes herein can in particular be chosen in such a manner that the drying effect regions of two neighboring fan elements slightly overlap or are directly mutually contiguous such that a drying effect is achieved across the entire region of the collection face. In other embodiments, in particular, when the collection face moves relative to the pivot axes, such as in the case of a conveyor belt being the collection face, for example, even comparatively large spacings can be provided between the pivot axes such that only a reduced or no drying effect is achieved in intermediate spaces. It is to be understood that the pivot axes for the plurality of fan elements preferably run so as to be mutually parallel. It is particularly preferable for all pivot axes to run vertically, or to be aligned so as to be perpendicular to the collection face.

According to a further preferred embodiment it is provided that the drying device extends in the longitudinal direction, in particular, that the collection face is formed by a conveyor element, such as an endless conveyor span, that extends in the longitudinal direction. Such a geometric alignment of the drying device is particularly suitable for being used in poultry management devices which have a plurality of poultry living areas in mutual succession in a longitudinal direction. The collection face herein can preferably comprise a conveyor element, such as an endless conveyor span, which likewise extends in the longitudinal direction. A drying effect along the entire or a major part of the length of the poultry living device in the longitudinal direction is achieved on account thereof. The endless conveyor span can, in particular, be a conveyor belt which is deflected by deflection rollers at both ends of the poultry management device in the longitudinal direction and by way of which the animal droppings are conveyed. Finite conveyor belts which are utilized as a collection device are also conceivable. Said finite conveyor belts, for the purpose of conveying away the droppings, are wound up at one end of a row of a poultry living device, wherein the droppings herein are removed from the collection face. The finite belt is subsequently unwound again so that the belt is again available for collection below the living area. The collection face can furthermore receive devices, for example, cable-pulled slider elements or clearing elements, which discharge the droppings. The animal droppings in such devices are either transported away in the longitudinal direction or are pushed laterally away from the collection faces at 90° in relation to the longitudinal extent.

According to a further preferred embodiment it is provided that the poultry living area extends in a longitudinal direction and has a width that is perpendicular to the longitudinal direction; the drive device is configured for driving the fan element in a reciprocating movement across a predetermined pivot angular range; the length of the fan element that runs so as to be radial to the pivot axis is larger than half the width of the poultry living area; and the predetermined pivot angular range is chosen such that the fan element does not extend beyond the width of the poultry living area in any movement portion of the reciprocating movement.

It is to be understood in principle that it is preferable for the dimensioning of the fan element and the movement of the fan element by the drive installation to be adapted such that the fan element in the movement thereof does not extend out of the poultry management device in order to avoid any risk of injury to operator personnel on account thereof in an aisle beside the poultry management device. This can be achieved, on the one hand, in that the length of the fan element radial to the pivot axis is smaller than half the width of the poultry living area and the fan element in this way cannot protrude from the poultry management device at any time of the pivoting or rotating movement when the pivot axis is disposed in the center of the width. In other applications, in particular, when a poultry management device that extends by a large length in the longitudinal direction is to be subjected to a drying effect by a small number of fan elements, it can by contrast be advantageous for the length of the fan element to be larger than half the width of the poultry living area, so that the fan element in a full rotation about the pivot axis would protrude in the width direction from the poultry management device. It is preferable in this instance in such a constellation for a reciprocating movement to be performed in a predetermined pivot angular range which is chosen so as to be so small that the fan element at all times remains within the width of the poultry living area, or the width of the poultry management device, respectively. In the case of this embodiment, the pivot angular range can approximately be tan−1 of the quotient from half the width of the poultry management device in relation to the length of one plate-shaped element of the fan element in order for a protrusion of the fan element in the width direction to be prevented.

A further aspect of the invention is a drying device for drying poultry droppings lying on a collection face of a collection device in a poultry management device, in which the drying device comprises a fan element which is mounted so as to be pivotable about a pivot axis which is aligned at an angle of 45° to 90° in relation to the collection face, wherein the drying device is preferably configured for being disposed between the living area and the collection face; the drying device comprises a drive installation which is configured for setting the fan element in a rotating movement about the pivot axis, wherein the rotating movement is a continuous rotating movement about the pivot axis or is a reciprocating pivoting movement about the pivot axis; the fan element comprises a first plate-shaped element which, proceeding from the pivot axis, extends in a first radial longitudinal direction; the fan element comprises a second plate-shaped element which, proceeding from the pivot axis, and extends in a second radial longitudinal direction which, proceeding from the pivot axis, runs in a direction opposing the first longitudinal direction; the first and optionally the second plate-shaped element comprises/comprise an elastomeric material, in particular is/are configured from an elastomeric material; the first and optionally the second plate-shaped element has/have an elastic deformation capability which is configured such that the first and optionally the second plate-shaped element is/are elastically deformed when driven by the drive device; the drive device is configured in such a manner that said drive device drives the drying device in a pivoting movement that is configured so as to be reciprocating, and the frequency of the pivoting movement lies in a range about a resonant frequency of the drying device, preferably in a resonant frequency of the drying device; the drive device comprises a drive unit which by means of a coupling element is mechanically connected to the drying device, wherein the coupling element is preferably a cable pull device; the drying device comprises a plurality of fan elements which are in each case mounted so as to be pivotable about a pivot axis that is assigned to each fan element, wherein the pivot axes are aligned at an angle of 45° to 90° in relation to the collection face and are mutually spaced apart in a longitudinal direction, and is configured for being installed below an animal living area which extends in a row along the longitudinal direction; and/or the poultry living area extends in a longitudinal direction and has a width that is perpendicular to the longitudinal direction; the drive device is configured for driving the fan element in a reciprocating movement across a predetermined pivot angular range; the length of the fan element that runs so as to be radial to the pivot axis is larger than the width of the poultry living area; and the predetermined pivot angular range is chosen such that the fan element does not extend beyond the width of the poultry living area in any movement portion of the reciprocating movement.

Such a drying device can be used for equipping a poultry management device with effective animal dropping drying. Such a drying device can, in particular, be used for retrofitting an existing animal management device. The drying device herein can be refined by way of the features of the drying device of the above-described animal management device, and in terms of the variants and advantages of said features reference is made to the preceding description.

BRIEF DESCRIPTION OF THE DRAWINGS

A preferred exemplary embodiment of the invention will be explained by means of the appended figures in which:

FIG. 4 shows a detailed perspective partial view of the region B bordered in FIG. 2; and FIG. 5 shows a detailed perspective partial view of the region C bordered in FIG. 2.

DETAILED DESCRIPTION OF THE EMBODIMENTS

Figure 1:
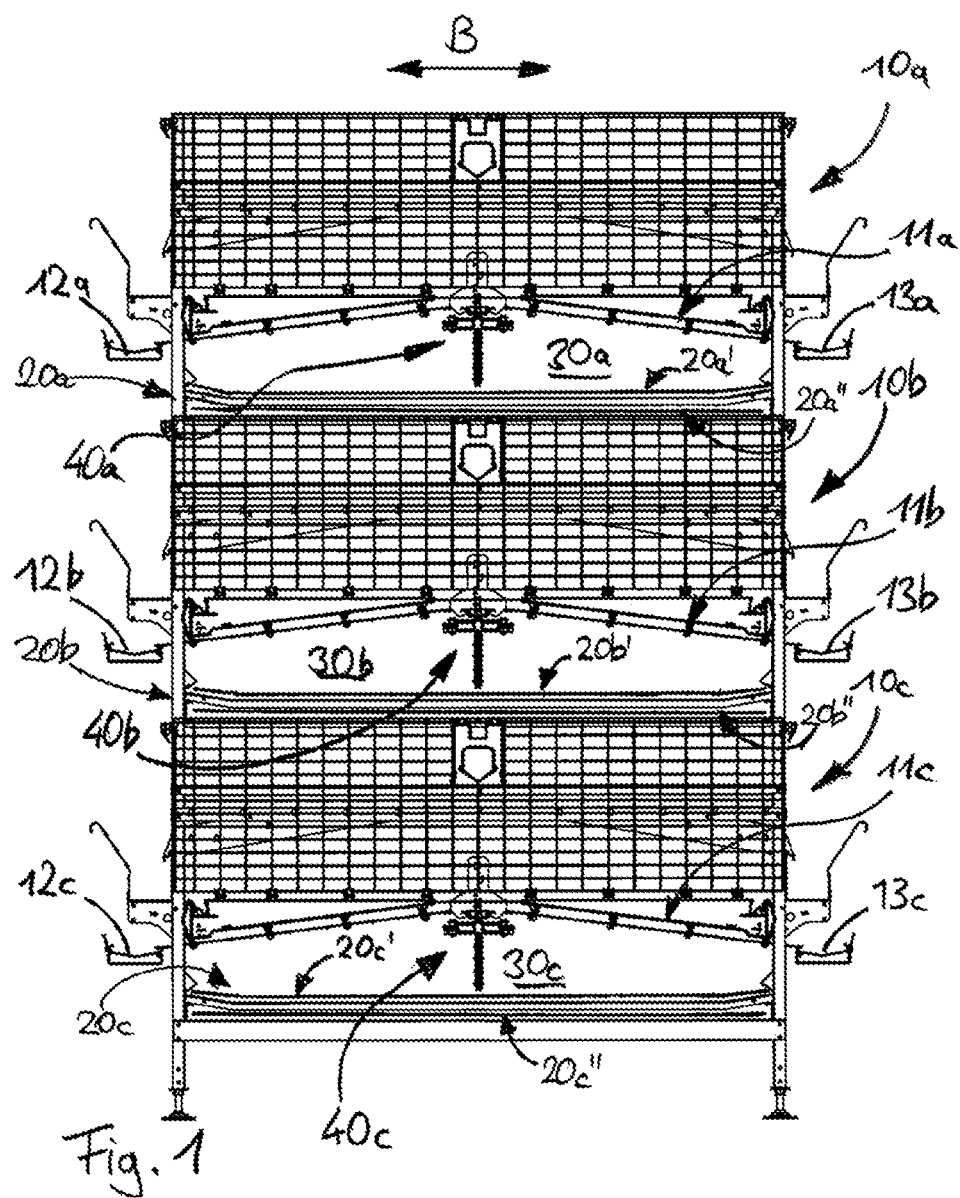
FIG. 1 shows a frontal view of a poultry management device according to the invention.

With reference first to FIG. 1, a preferred embodiment according to the invention comprises three poultry living areas 10a, 10b, 10c which are mutually tiered in a vertical manner. Each poultry living area 10a, 10b, 10c has standing areas 11a, 11b, 11c which are shaped in the manner of a low-pitched roof and which, proceeding from the central longitudinal axis, run so as to be laterally inclined in an oblique downward manner. These inclined standing areas 11a, 11b, 11c serve as a platform for chickens in the animal living area 10a, 10b, 10c and have the effect that eggs laid within the animal living areas 10a, 10b, 10c can roll off laterally to either side into egg belts 12a, 12b, 12c, 13a, 13b, 13c and can be collected therein.

The animal standing areas 11a, 11b, 11c are configured as grates and are, therefore, permeable to droppings deposited by the animals which stand thereon or thereabove. A droppings belt 20a, 20b, 20c which as an endless conveyor belt carries out a conveying movement in the longitudinal direction, thus along the longitudinal axis L, is disposed below each animal standing area 11a, 11b, 11c. The animal droppings that fall down accumulate on the upwardly pointing surface of the upper span 20a', 20b', 20c' of said droppings belt 20a, 20b, 20c. The droppings belt as the lower span 20a″, 20b″, 20c″ is returned in the opposite longitudinal direction below a cross-tie plane.

A free space 30a, 30b, 30c exists between the animal standing area 11a, 11b, 11c and the droppings belt 20a, 20b, 20c. A drying device 40a, 40b, 40c is disposed in this free space 30a, 30b, 30c and can move in the latter.

Figure 2:
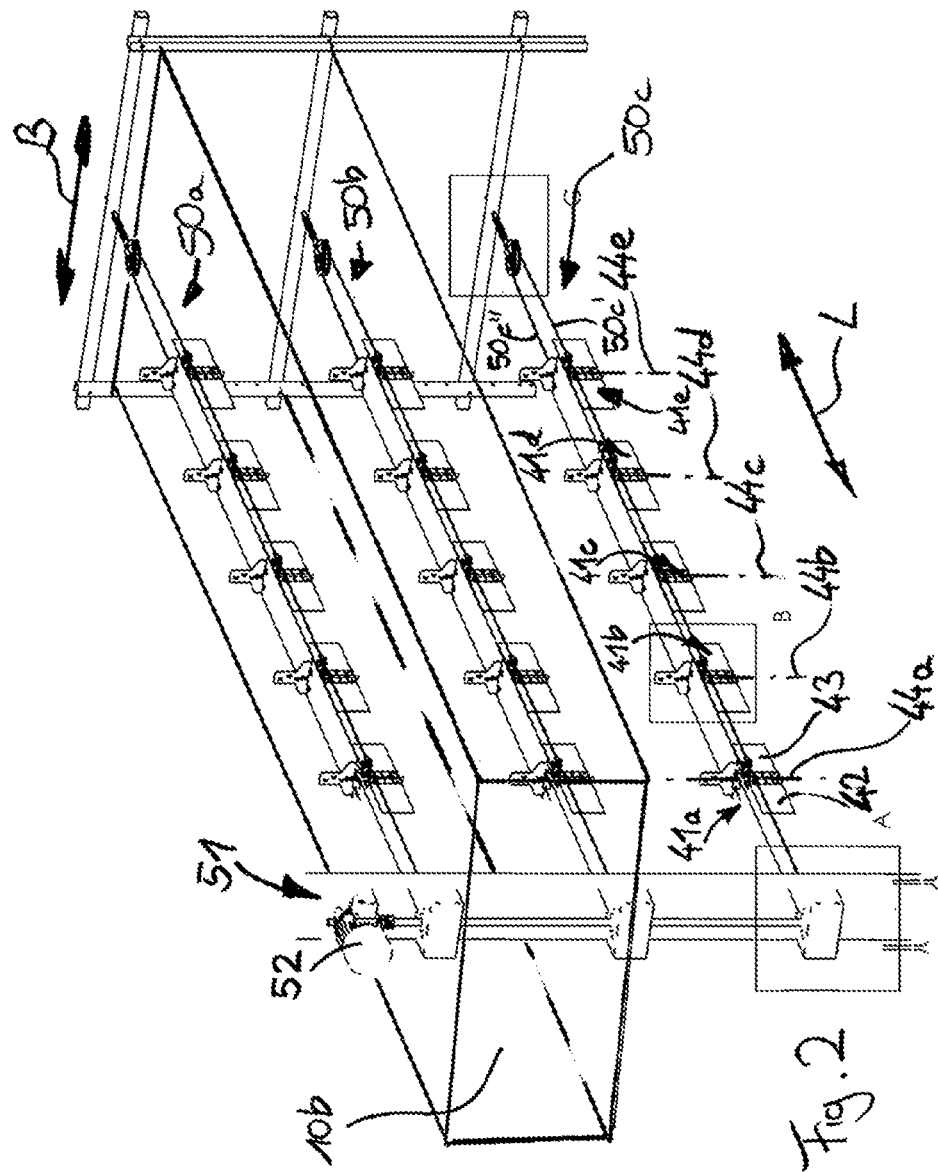
FIG. 2 shows a perspective view of the poultry management device according to FIG. 1 in a partial illustration of substantial components related to the installed drying device.

FIG. 2 shows the drying device 40a, 40b, 40c of the animal management device according to FIG. 1. Substantial parts of the animal living areas, such as the animal standing areas 11a, 11b, 11c, the side walls that delimit the animal living area, egg collection belts, and various framework parts, for example, are not illustrated in FIG. 2 in order for the individual parts of the drying device to be more readily identifiable. Only the central animal living area 10b is schematically plotted as a cuboid space.

The drying device in terms of the detailed construction thereof in each individual plane will be explained hereunder by means of the lowermost plane. The drying device 30a, 30b, 30c in each plane of the animal management device comprises a plurality of fan elements 41a-e.

Each fan element 41a-e comprises two plate-shaped components 42, 43 which, proceeding from a pivot axis 44a-e, extend in the radial direction. Said pivot axes 44a-e are mutually spaced apart in the longitudinal direction and lie in a line which extends in the longitudinal direction L.

The plate-shaped elements 42, 43 lie in a vertical plane. The pivot axes 44a-e are aligned so as to be vertical. Therefore, the pivot axes 44a-e run so as to be parallel to the faces of the plate-shaped components 42, 43. Both plate-shaped components 42, 43 in relation to the pivot axes 44a-e are dimensioned so as to be of identical length in the axial and the radial direction.

The fan elements formed by the plate-shaped components 42, 43 are shown in FIG. 2 in an alignment in which said fan elements lie so as to be parallel to the longitudinal direction L. The fan elements can be pivoted, from said alignment, about the pivot axes 44a-e. To this end, a cable pull mechanism 50a, 50b, 50c is provided in each of the three planes.

The cable pull mechanism 50a, 50b, 50c serves as a coupling to a drive unit 51. Said drive unit 51 comprises an electric motor 52 which drives an upright shaft 53 and sets the latter in a continuous rotating movement.

Figure 3B:
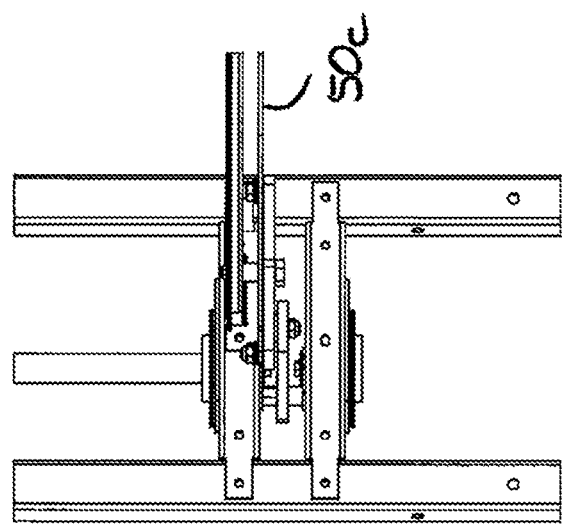
FIG. 3B shows a lateral view of the fragment according to FIG. 3A.
Figure 3A:
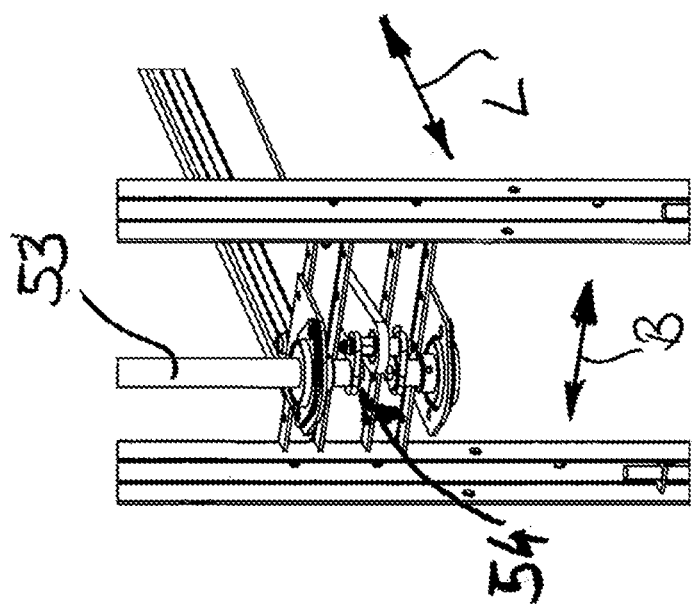
FIG. 3A shows a detailed perspective partial view of the region A bordered in FIG. 2.

FIG. 3A shows a crank gear mechanism 54 which converts the continuous rotating movement of the shaft 53 to a reciprocating traction movement of the cable pull device 50a, 50b, 50c. The continuous rotating movement of the drive shaft 53, by means of the crank gear mechanism 54, is converted to a reciprocating movement of the cable pulls 50a, 50b, 50c. On account thereof, the transmission mechanism that is designed as a revolving cable pull 50a, 50b, 50c moves such that in a regular sequence the one cable pull portion 50c' of the cable pull loop that is deflected at the rear end is pulled in a first longitudinal direction, and the other cable portion 50c″ is moved, in an opposing manner thereto, in a second longitudinal direction, and said form of movement is then reversed, and the one cable pull 50c' is moved in the second longitudinal direction, and the other cable pull 50c″ moves in the first longitudinal direction.

FIG. 5 shows the deflection of the one cable portion 50c' to the other cable portion 50c″ by means of a deflection roller 55, the vertically aligned rotation axis of the latter by way of a tension spring 56 being fastened to a cross tie at the rear end in the longitudinal direction of the animal management device. The cable pull system 50c, by means of the spring-tensioned deflection roller 55, is subjected to a pretension and, on account thereof, is held taut.

FIG. 4 shows a fan element 41. The fan element comprises a fastening device 45 which is configured in the region of the pivot axis 44 and which in a slot 45a on the one side of the pivot axis 44 receives the plate-shaped element 42, and in a slot 45b, opposite thereto in relation to the pivot axis 44, receives the plate-shaped element 43. The plate-shaped elements 42, 43 at the end thereof that lies toward the pivot axis 44 are provided with a transverse web and, on account thereof, are in each case anchored in a form-fitting manner in a respective groove 45a' in the fastening element 45 in a form-fitting manner and prevented from slipping out of the slot in the radial direction in relation to the pivot axis 44.

The plate-shaped elements 42, 43 can be made from thermoplastic elastomers, for example, polyamide, polyethylene, polypropylene, or respective mixtures based thereon, and, on account thereof, be both elastically deformable as well as resistant to chemicals and correspondingly be susceptible to material fatigue in continuous operation to a minor degree. The material thickness of the plate-shaped elements decreases in the radially outward direction, from a radially inward thickness Di to a radially outward thickness Da, so as to obtain a uniform flexural behavior of the plate-shaped elements. In the reciprocating pivoting movement which the fan element 41 carries out the plate-shaped elements 42, 43 are deformed about vertical bending axes, thus bending axes that run so as to be parallel to the pivot axis 44.

Two outrigger arms 71, 72 are connected in a torque-locking manner to the fastening device 45 at the upper end of the latter. The outrigger arms 71, 72 extend in the radial direction on either side of the pivot axis 44, so as to be perpendicular to the plane of the plate-shaped elements 42, 43. A cable pull receptacle 73, 74 is fastened to the radially outward end of each of the two outrigger arms 71, 72, said cable pull receptacle 73, 74 being mounted so as to be rotatable about a vertical axis 73', 74'. Each of the two cable pull receptacles 73, 74 has a cable receptacle portion in which a traction cable which extends so as to be perpendicular to the pivot axis 44 can be fastened. In the case of the embodiment depicted, this is implemented by two cable receptacle portions 75, 76 which are mutually spaced apart in the longitudinal direction of the cable to be received, and between which a cable clamping mechanism can be fixedly fastened to the cable in an intermediate space 77, said cable clamping mechanism having the effect that the cable cannot move in the longitudinal direction within the cable receptacle devices 73, 74.

The fan element can be set in a fan movement that is carried out in a reciprocating manner by alternatingly pulling on the outrigger arms 71, 72 by means of the cable pull 50c, in which fan movement the plate-shaped components 42, 43 are moved in the manner of a fan in a predetermined angular range and, on account thereof, fan drying air. Said drying air effects efficient drying of the animal droppings on the upper span of the droppings belt lying therebelow.

In the case of the embodiment illustrated, the length of the plate-shaped elements 42, 43 in the radial direction is chosen such that said length is smaller than half the width of the animal management device in the width direction B. On account thereof, no fan element can make its way into a region outside the animal management device, even in the case of a pivot angle of 180° at which the fan elements are thus pivoted by +/−90° in a reciprocating manner in relation to the position illustrated in the figures. It is to be understood in principle that the length of the plate-shaped elements 42,

43 can also be greater than half the width of the animal management device. In such a case, it is preferable for a pivot angle of, for example, only 90°, thus +/−45° about the central position illustrated in the figures, to be carried out and, on account thereof, any outward protrusion of the plate-shaped elements 42, 43 at the reversal points of the pivoting movement to be avoided.

The invention claimed is:

1. A poultry housing device comprising:
    a poultry living area;
    a collection device located below the poultry living area with a collection surface for poultry droppings; and
    a drying device adapted to dry the poultry droppings on the collection device and comprising a fan member pivotally mounted about a pivot axis oriented at an angle of 45-90° to the collection surface;
    wherein the drying device comprises a driving device adapted to impart a rotational movement to the fan member about the pivot axis, and wherein the rotational movement is a reciprocal pivotal movement about the pivot axis; and
    wherein the drying device is disposed between the poultry living area and the collection area.

2. The poultry housing device of claim 1, wherein the fan member has a fan surface which runs parallel to the pivot axis or perpendicular to the collecting surface, and wherein the fan member is formed by a fan surface which runs parallel to the pivot axis or perpendicular to the collecting surface.

3. The poultry housing device according to claim 1, wherein the fan member comprises a first plate-shaped element extending from the pivot axis in a first radial longitudinal direction.

4. The poultry housing device according to claim 3, wherein the fan member comprises a second plate-shaped element extending from the pivot axis in a second radial longitudinal direction extending from the pivot axis in the opposite direction to the first radial longitudinal direction.

5. The poultry housing device according to claim 4, wherein at least the first plate-shaped element comprises and is formed from an elastomeric material.

6. The poultry housing device according to claim 3, wherein the first plate-shaped element has an elastic deformability such that the first plate-shaped element deforms elastically when driven by the drive device.

7. The poultry housing device according to claim 1, wherein the drive device drives the fan member in a reciprocally designed pivoting movement and the frequency of the pivoting movement substantially lies in a resonant frequency of the drying device.

8. The poultry housing device according to claim 1, wherein the drive device comprises a drive unit which is mechanically connected to the fan member by means of a coupling element comprising a cable pull device.

9. The poultry housing device according to claim 1, wherein the poultry living area extends in a row along a longitudinal direction and the drying device comprises a plurality of fan members, each of the plurality of fan members being pivotally mounted about a plurality of pivot axes each associated with each of the plurality of fan members, the plurality of pivot axes associated with each of the plurality of fan members being oriented at an angle of 45-90° with respect to the poultry living area and spaced from each other in a longitudinal direction.

10. The poultry housing device according to claim 1, wherein the drying device extends in a longitudinal direction and the collecting surface is formed by a conveying element extending in the longitudinal direction, wherein the collecting surface comprises an endless conveying run.

11. The poultry housing device according to claim 1, wherein:
    the poultry living area extends in a longitudinal direction and has a width perpendicular to the longitudinal direction;
    the drive device drives the fan member into the reciprocal pivotable movement over a predetermined pivot angle range;
    a length of the fan member extending radially from the pivot axis is greater than half the width of the poultry living area; and
    the predetermined pivot angle range is selected such that the fan member does not extend beyond the width of the poultry living area in any movement section of the reciprocal pivotable movement.

12. A drying device for drying poultry droppings stored on a collecting surface of a collecting device in a poultry housing device comprising:
    a poultry living area;
    a collection device located below the poultry living area with a collection surface for poultry droppings; and
    a drying device adapted to dry the poultry droppings on the collection device and comprising a fan member pivotally mounted about a pivot axis oriented at an angle of 45-90° to the collection surface;
    wherein the drying device comprises a driving device adapted to impart a rotational movement to the fan member about the pivot axis, and wherein the rotational movement is a reciprocal pivotal movement about the pivot axis:
    wherein the fan member pivotally mounted about the pivot axis is oriented at an angle of 45-90° to the collecting surface; and
    wherein;
        the drying device disposed between the poultry living area and the collecting surface;
        the fan member comprises a first plate-shaped element extending from the pivot axis in a first radial longitudinal direction;
        the fan member comprises a second plate-shaped element which, starting from the pivot axis, extends in a second radial longitudinal direction which, starting from the pivot axis, runs in the opposite direction to the first radial longitudinal direction;
        at least the first plate-shaped element comprises and is formed from an elastomeric material;
        at least the first plate-shaped element has an elastic deformability such that the first plate-shaped element deforms elastically when driven by the drive device;
        the driving device drives the drying device in a reciprocally designed pivoting movement and the frequency of the pivoting movement lies in a range substantially in a resonance frequency of the drying device;
        the driving device comprises a drive unit which is mechanically connected to the drying device by means of a coupling element comprising a cable pull device;
        the drying device comprises a plurality of fan elements each pivotally mounted about a pivot axis associated with each fan element, the pivot axes being aligned at an angle of 45-90° to the collecting surface and spaced from each other in a longitudinal direction of the poultry living area and adapted to be installed below a poultry staying area extending in a row along the longitudinal direction of the poultry living area; or the poultry staying area extends in the longitudinal direction of the poultry living area and has a width perpendicular to the longitudinal direction of the poultry living area, the driving device driving the fan member into the reciprocal pivotable movement over a predetermined pivot angle range, a length of the fan member extending radially from the pivot axis is greater than the width of the poultry living area, and the predetermined pivot angle range is selected such that the fan member does not extend beyond the width of said poultry living area in any portion of the reciprocal pivotable movement.

\* \* \* \* \*